United States Patent [19]
Kröfta et al.

[11] Patent Number: 5,268,099
[45] Date of Patent: Dec. 7, 1993

[54] LAMELLAR CLARIFIER WITH RECTILINEAR TANK

[75] Inventors: Milos Krofta, Lenox; Robert P. Langdon, Pittsfield, both of Mass.

[73] Assignee: Lenox Institute of Water Technology, Inc., Lenox, Mass.

[21] Appl. No.: 972,593

[22] Filed: Nov. 6, 1992

Related U.S. Application Data

[63] Continuation-in-part of Ser. No. 886,414, May 20, 1992, and a continuation-in-part of Ser. No. 755,697, Sep. 6, 1991, Pat. No. 5,188,729, which is a continuation of Ser. No. 241,384, Sep. 7, 1988, Pat. No. 4,931,175.

[51] Int. Cl.$^5$ .............................................. B01D 21/04
[52] U.S. Cl. ................................ 210/221.2; 210/521; 210/525; 210/526
[58] Field of Search ............... 210/86, 94, 104, 221.1, 210/221.2, 520, 521, 528, 530, 519, 523, 525, 526, 527, 522; 261/23.1, 122

[56] References Cited

U.S. PATENT DOCUMENTS

| | | | |
|---|---|---|---|
| 1,020,013 | 3/1912 | Arbuckle | 210/521 |
| 2,106,156 | 1/1938 | Munro | 210/526 |
| 2,660,310 | 11/1953 | Hapman | 210/526 |
| 2,874,842 | 4/1955 | Krofta | 210/540 |
| 3,067,878 | 7/1959 | Genter et al. | 210/521 |
| 3,182,799 | 5/1965 | Krofta | 210/117 |
| 3,452,869 | 1/1967 | O'Neill | 210/520 |
| 3,599,795 | 8/1971 | Worlidge | 210/526 |
| 3,673,891 | 10/1971 | Clontier | 210/526 |
| 4,022,696 | 5/1977 | Krofta | 210/520 |
| 4,184,967 | 1/1980 | Krofta | 210/525 |
| 4,346,005 | 8/1982 | Zimmerman | 210/232 |
| 4,377,485 | 3/1983 | Krofta | 210/704 |
| 4,626,345 | 12/1986 | Krofta | 210/104 |

FOREIGN PATENT DOCUMENTS

1101262 7/1984 U.S.S.R. .

*Primary Examiner*—Christopher Upton
*Attorney, Agent, or Firm*—Dike, Bronstein, Roberts & Cushman

[57] ABSTRACT

A tank with a generally flat, rectilinear bottom wall receives raw water for clarification by flotation. An array of lamellae define a set of generally vertically oriented channels. Flotation occurs in each channel. The channels are preferably inclined. A pair of endless chains or the like rotate alongside the tank to move a succession of mutually spaced, paddle-like lamellae through the tank. Sliding seals secured to the edge or edges of the lamellae isolate individual channels, or groups of channels, as they move through the tank. The channels lock and move a column of water through the tank with substantially no turbulence.

13 Claims, 3 Drawing Sheets

LAMELLAR CLARIFIER WITH RECTILINEAR TANK

REFERENCE TO RELATED APPLICATIONS

This application is a continuation-in-part of U.S. Ser. No. 07/886,414 filed May 20, 1992 and U.S. Ser. No. 07/755,697 filed Sep. 6, 1991, now U.S. Pat. No. 5,188,729, which in turn is a continuation of U.S. Ser. No. 07/241,384, filed Sep. 7, 1988, now U.S. Pat. No. 4,931,175.

BACKGROUND OF THE INVENTION

This invention relates in general to an apparatus and method for the clarification of water where the removal of suspended particles is accomplished by a flocculating agent and flotation using a stream of rising, microscopic air bubbles. More specifically, it relates to an improved clarification apparatus and method of the general type described in U.S. Pat. Nos. 4,022,696 and 4,931,175 using single stage flotation in a flotation tank.

Water clarification, the removal of particulate contaminants suspended in water, is used to treat waste water from manufacturing processes, particularly in the paper and pulp industries, in the treatment of municipal water drinking supplies, and in sewage treatment. The water can be clarified by sedimentation or flotation of the particles. Known sedimentation techniques and apparatus are efficient, but are limited even at peak efficiency to a comparatively slow sedimentation rate, about 0.5 gallons per minute per square foot (40 l/m²/min). To handle large volumes of raw input water, sedimentation facilities must therefore be large, with attendant cost and space utilization disadvantages.

Flotation techniques dissolve a few percent of air by volume in pressurized water and then release the air in the form of microscopic bubbles which attach to the particles and carry them upwardly to the surface where they form a floating sludge. The particles are usually flocculated using conventional flocculating agents such as alum before the air bubbles are introduced. Flotation techniques are theoretically capable of achieving clarification rates of 7.5 gallons per minute per square foot of flotation area (300 l/m²/min). Heretofore in practice the rates have been less than this theoretical value, but significantly better than for sedimentation techniques.

Several early attempts by one of the applicants to use flotation techniques to clarify water are described in U.S. Pat. No. 2,874,842 issued in 1959 and U.S. Pat. No. 3,182,799 issued in 1965. They use a stationary tank with no skimmers or other moving components in the tank. The gas bubbles were introduced via the main raw water inlet and guided within the tank by an internal deflector ('842) or a stack of internal baffles ('799). Because the gas bubbles were guided by stationary components, there was no design problem created by the turbulence of moving parts in the flotation tank. Also these devices did not lend themselves to treatment at high flow rates. The '799 apparatus had the additional problems in that (i) the inlet water had to be separately fed from the side to the region between each adjacent pair of baffles and (ii) the flow paths for floated particles varies depending on the vertical position of the associated baffles defining the flow path. This latter situation means that the apparatus either does not fully treat the inlet water, or is slow.

One of the present applicants also holds several other U.S. patents for water clarification apparatus and processes, including U.S. Pat. Nos. 4,022,696; 4,377,485; 4,626,345; 4,184,967; and 4,931,175, which greatly improve over the performance of the early '842 and '799. In the '696 clarifier, sold under the trade designations "SPC" and "Supracell", the flotation occurs in a circular tank. The raw water is fed into the tank via a central pipe, a hydraulic joint, and an inlet pipe with multiple outlets immersed in the tank which rotates about the tank. The inlet flow is oriented opposite to the direction of rotation of the inlet pipe and is at a velocity with respect to the rotation rate such that the raw water has a net zero velocity as it enters the tank. The raw water inlet flow assembly and a scoop for removing the floated sludge are mounted on a carriage that rotates about the tank. The scoop is preferably of the type described in U.S. Pat. No. 4,184,967 of one of the present applicants. The rate of rotation is set so that the floated particles will reach the surface of the water held in the tank in the time of one rotation. A good degree of clarification can be achieved with each rotation of the carriage using a comparatively shallow tank, e.g. 16-18 inches. This SPC unit clarifies at a rate of about 130 liters/m²/min. This is much better than the rate using sedimentation techniques, but less than half of the theoretical maximum rate.

In the Supracell and the other clarifiers described in the aforementioned patents, there are common design features and limitations. For one, the flotation of the flocced particles is generally vertical, and is in a body of water that is comparatively shallow and generally free from turbulence. Also, in all of these designs the removal of the floated sludge is by a bladed, rotating scoop feeding an inclined discharge pipe. Also, heretofore, in order to increase the capacity of a given type of clarifier, one built a larger diameter tank. While in theory one can build a large enough tank to accommodate any clarification load, cost and space constraints have provided practical limitations on the capacities of these units.

It is therefore a principal object of this invention to provide an improved water clarification apparatus that can increase the clarification rate of known flotation-type clarifiers by a factor of at least two with no attendant increase in the size of the unit.

Another principal object is to provide the foregoing increase in productivity with a comparatively small increase in cost.

Yet another object is to provide an improved sludge removal apparatus.

SUMMARY OF THE INVENTION

Clarification of raw water treated with a flocculating agent and dissolved air that is released to form microscopic bubbles occurs in a body of the water held in a tank. The tank has a generally flat bottom which may include apertures found in one sector of the bottom wall to withdraw clarified water from the tank and a sump to collect settled particulates.

A set of lightweight, plate-like lamellae substantially fill the tank. The lamellae are organized to define a set of generally vertically oriented channels. Each channel has generally solid side walls to lock a column of water within the channel during clarification. The tank is rectilinear, preferably generally rectangular, and the lamellae are paddle-like plates that each extend substantially across the tank in a direction transverse to the direction of their movement through the tank. All, or at least a portion of, the paddles have sliding seals between themselves and at least the bottom wall. The seals lock a portion of the water in each channel to isolate the flotation clarification in each channel from turbulence produced by movement of the lamellae in the tank. They also wipe sedimented contaminants to a sump formed in the bottom wall of the tank.

There is an arrangement for producing a relative movement between the array of lamellae and the tank. A pair of endless chains run alongside the tank in the direction of movement of the paddles. A pair of shafts and sprockets mounted at the ends of each shaft support and drive the chains. Links mounted on the chains secure the paddles with a generally uniform spacing between the paddles in the direction of their motion.

Raw treated water enters one end of the tank, preferably under an apertured, curved plate that follows the locus of the free ends of the paddles—or their edge seals—as they enter the tank. Continued movement of the paddles carries them through the tank. Seals sliding on the bottom and side walls to reduce turbulence in the channels. At the opposite end another curved, apertured plate allows clarified water to flow into a collection compartment that feeds a clarified water outlet. Continued rotation allows sludge to slide off the paddles onto an adjustable ramp that guides the sludge to a collection conduit.

The tank includes a sump in its bottom wall with a drain and automatic flush valve to remove settled particulates carried along by the lamellae and/or their wiper seals. The paddles can include stiffening ribs that also set the inter-paddle spacing. At least some of the paddles can have sludge ports at their ends adjacent the conveyor to allow the sludge to collect on a following paddle.

These and other features and objects of this invention will be more fully understood from the following detailed description which should be read in light of the accompanying drawings.

DETAILED DESCRIPTION OF THE PREFERRED EMBODIMENTS

Figure 1:
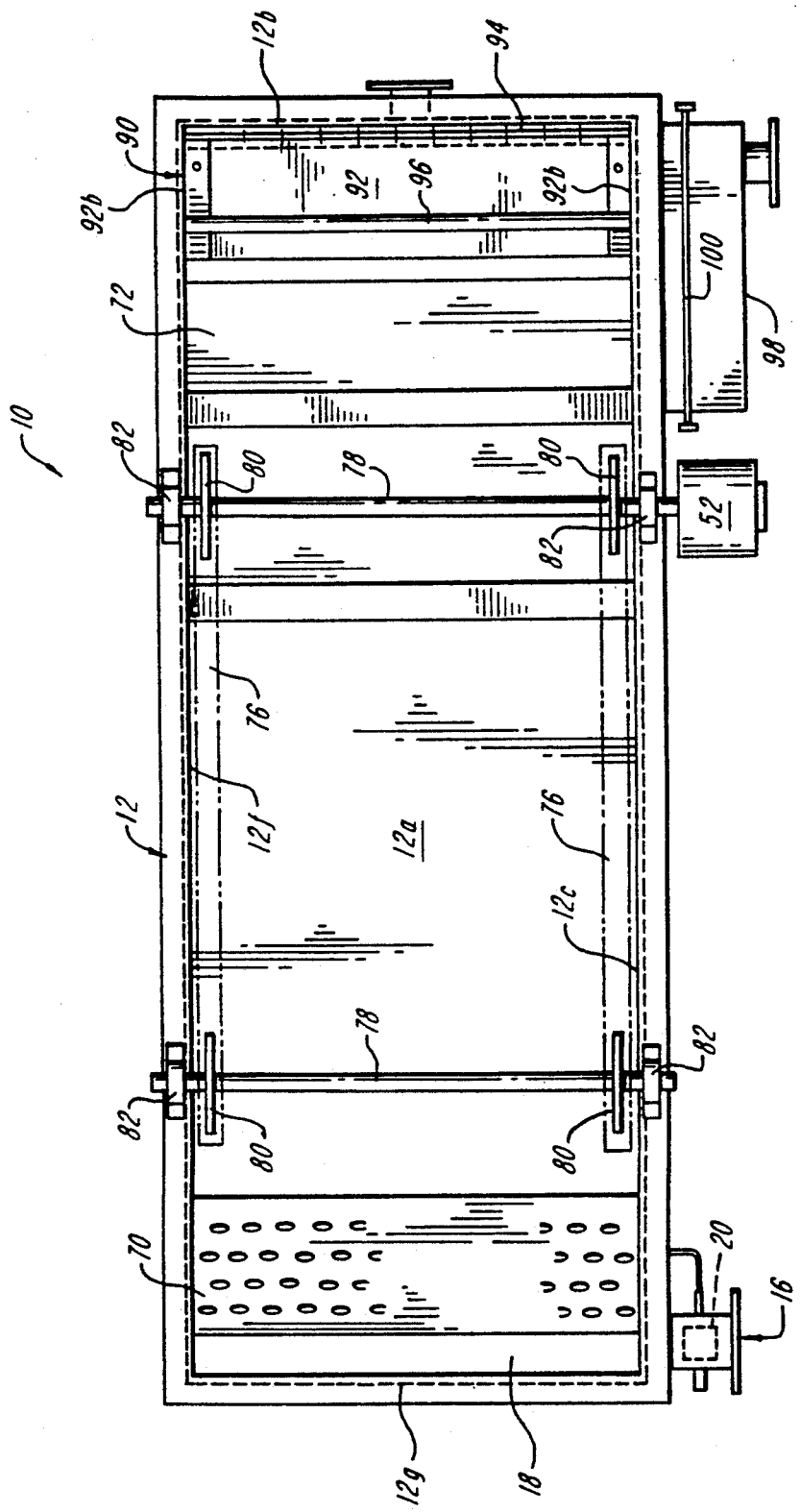
FIG. 1 is a top plan view of a rectangular tank lamellar clarifier according to the present invention with the plates omitted for clarity.
Figure 2:
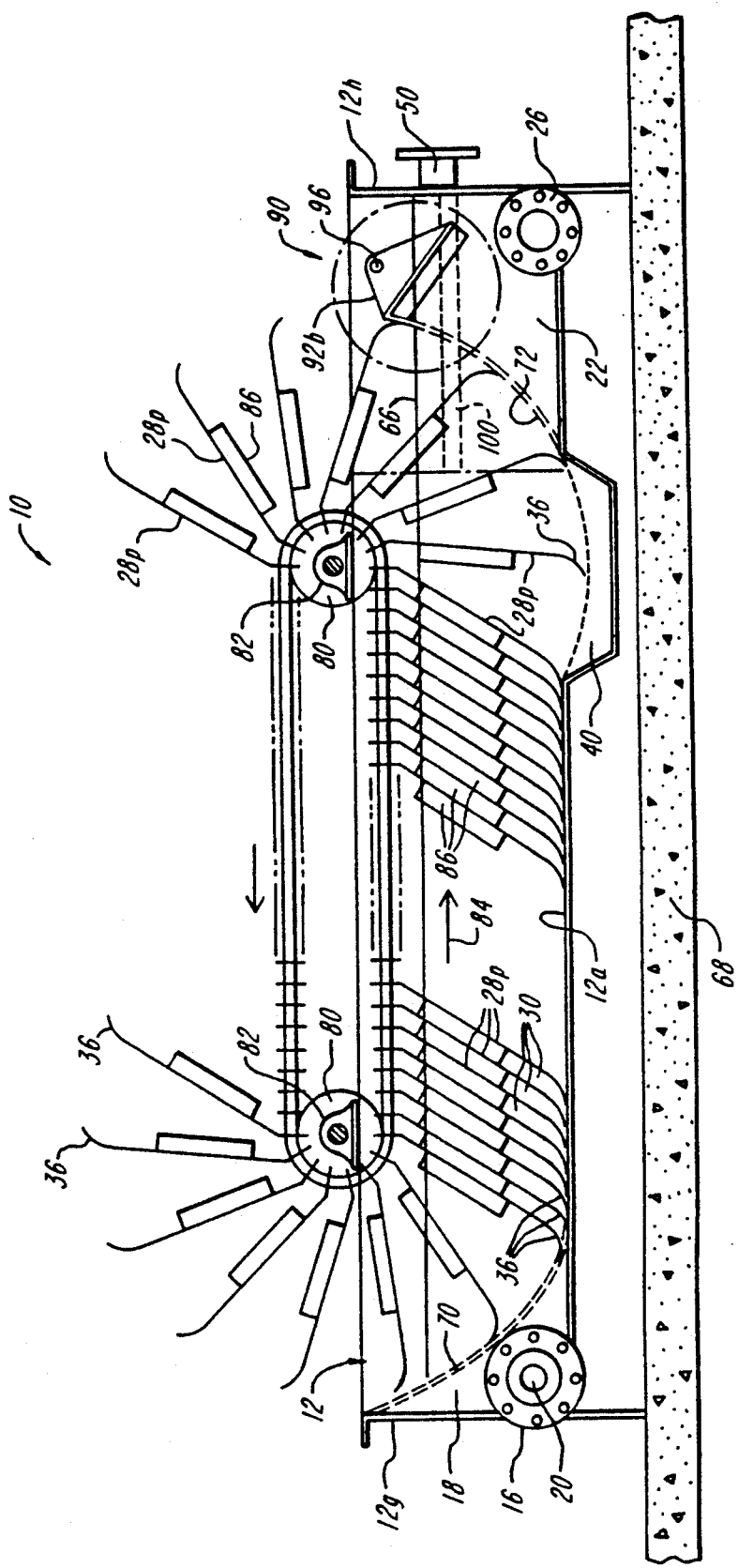
FIG. 2 is a view partially in side elevation and partially in vertical section of the clarifier shown in FIG. 1 but with a portion of the plates shown and with a detailed view, FIG. 2a, also in side elevation of the attachment of the plates to the chains.
Figure 2A:
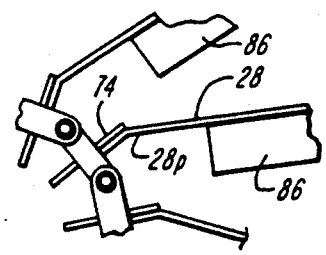
Figure 3:
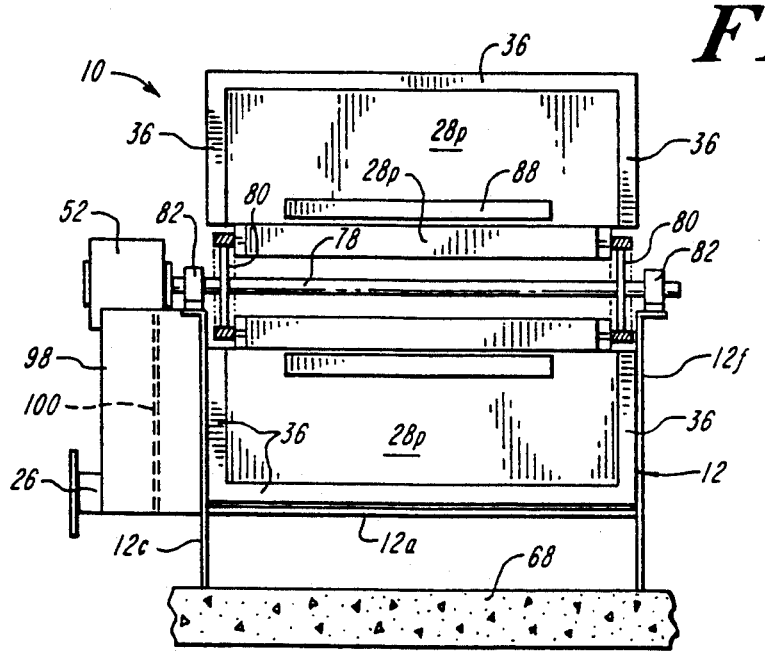
FIG. 3 is a view partially in end elevation and partially in vertical section of the exit end of the clarifier shown in FIGS. 1 and 2.

FIGS. 1-5 show a lamellar clarifier 10 according to the present invention. The clarifier 10 has a rectilinear tank 12 with a generally flat bottom wall 12a, flat side walls 12e, 12f, and entrance and exit end walls 12g and 12h, respectively. The bottom wall 12a is spaced above a support, e.g. a concrete floor or foundation 68, in part to provide clearance for a sump 40.

A curved apertured plate 70 defines a raw water distribution box 18 in combination with the entrance end wall 12g and an adjacent portion of the bottom wall 12a. An inlet 16 penetrates the side wall 12f and the plate 70. An inlet valve 20 mounted on the wall 12f releases pressurized water with dissolved air to form microscopic bubbles. A clarified water outlet 26 withdraws clarified water at the exit end of the tank. A curved, apertured plate 72 that mirrors the plate 70 defines a clarified water collection box 22 in combination with the exit end wall 12h and the adjacent portion of the bottom wall 12a.

A set of lamellae 28p move through the tank to define a set of channels 30. Each lamella 28p is generally a flat, rectangular plate of a thin plastic. While plastic is lightweight and resists corrosion, the strength and fabrication ease of stainless steel may be preferred. Each plate 28p carries at least a bottom seal 36 secured among its outer edge and has an angled inner edge 28p mounted onto a link 72 which in turn is supported on one of two endless chains 76, 76. Preferably the seal 36 also extends along the side of the plate to provide a sliding seal between the plates and the tank side walls 12e, 12f. A pair of shafts 78, 78 carry sprockets 80, 80 on their ends that engage the chains. Bearing assemblies 82, 82 support each shaft rotatably. A motor 52 drives one shaft. The shafts and sprockets thus support, locate and propel the chains to rotate in unison over the water held in the tank 12. The shafts 78, 78 extend across the tank; the chains move along the tank in the direction indicated by arrow 84. The plates 28p are mounted to also extend across the tank. The chains carry them in the direction 84 which is generally orthogonal to the plates, except for the inclination of the plates set by the angle between the main portion of the plates and the angled mounting portion 28p'.

Each plate 28p preferably has at least one stiffening rib 86 projecting from its back side to resist bending of the plate as it moves through the water propelling 1) a "column" of water in the channels 30 defined by adjacent plates and the side walls 12e, 12f, 2) the seals 36 which experience a sliding friction as they engage the tank, and 3) floated sludge that collects on the plates at the surface 66 of the water. The plates 28p lock a portion of water between adjacent plates and carry them through the tank in a generally horizontal direction. The plates are substantially solid and preferably close-fitting or sealed to the tank walls to reduce turbulence in the channels 30 and to produce in effect a net zero velocity condition for flotation clarification in the channels 30. Preferably only every fourth or fifth plate 28p is totally solid. The intervening plates have ports 88 positioned and sized to allow floated sludge to pass through the plate to collect on a following plate that is completely solid. This allows a sufficient mass of sludge to collect on a single plate to ensure that it will reliably slide off as the plates exit the tank. The ports 88 also lighten the assembly of plates.

The inclination of the plates 28p is about 60° from the horizontal. With an interplate spacing of about 1.7 inches, this degree of inclination produces a mutual overlap of the plates when they are projected onto a horizontal plane. For a tank depth of 16 to 20 inches, the overlapping produced by the plate characteristics given above is at least 50%, the exact value depending on the depth of the water and the height of the plates. This degree of overlapping is a direct measure of an increased treatment capacity as compared to a clarification unit otherwise the same, but using a straight vertical rise. Stated in other words, the inclination of the channels creates a longer path for the floccked particles carried to the surface of the water on rising air bubbles. This longer flotation path and attendant increase in flotation efficiency is achieved without increasing either the area or depth of the tank.

Figure 4:
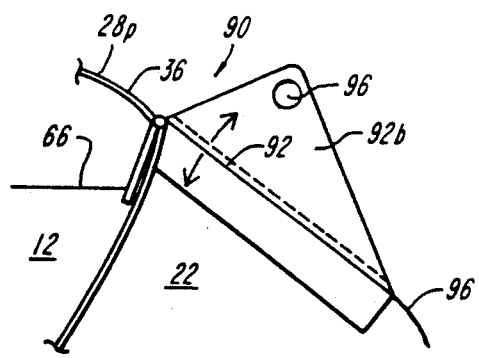
FIG. 4 is a detailed view in side elevation of the adjustable sludge ramp shown in FIGS. 1-3.
Figure 5:
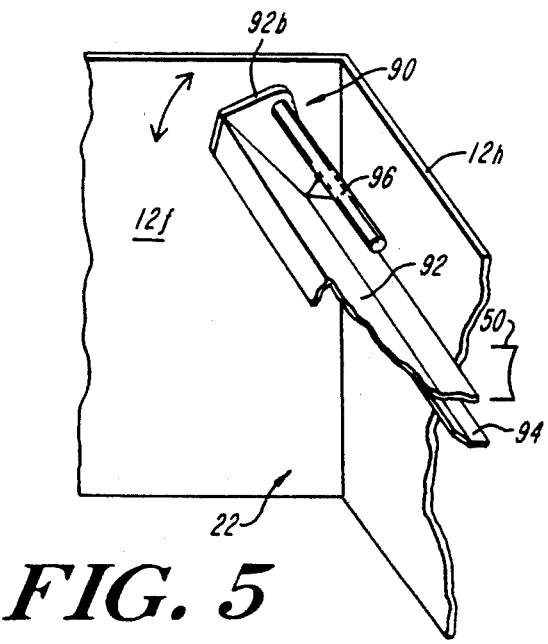
FIG. 5 is a detailed view in perspective of the ramp shown in FIG. 4.

Sludge is unloaded as an adjustable ramp 90 that extends from the plate 72 to a sludge outlet 50. As is best seen in FIGS. 4 and 5, the ramp 92 has a flat sludge delivery chute 92, preferably of stainless steel, with rubber seal members 92b, 92b at both sides. The lower edge of the ramp 92 pivots around a plastic "piano" hinge 94. An expansion bar 96 extends between the side seals to secure a desired angular inclination of the ramp 92. The upper edge of the ramp is set above the water level 66 so that the clarified water exits only through the box 22. Rotation of the chains brings each sludge carrying plate 28p to a position shown in FIG. 4 where the sludge is lifted out of the water and the plate 28p is downwardly inclined so that the wet sludge slides off the plate, onto the ramp surface 92, and then to the outlet 50. Water in the box 22 will rise against the bottom surface of the chute 92, but it and the seals 92b, 92b prevent the clarified water from exiting via the sludge outlet. A wier box 98 with an adjustable weir 100 built therein controls the clarified water level in the box 98 and the water level in the tank 12 generally.

In operation raw water treated with a flocculating chemical enters the tank 12 via the raw water inlet 16 and the box 18. The valve 20 introduces a stream of microscopic air bubbles into the water as it enters the box 18. The treated water then flows through the apertures in the plate 70 into the main part of the tank 12 where it is caught between adjacent "paddles" assemblies formed by the plates 28p and their edge seals 36. The plate 70 is positioned to engage the seals 36 and guide the paddle assemblies into the tank. The wier 100 sets the water level. Movement of the chains 76, 76 carries the paddle assemblies through the tank suspended from the lower run of the chains. Channels 30 lock a "column" of water—actually more in the shape of an inclined rectangular "slab" of water—between the plates and move it through the tank in the direction 84. The paddle assemblies substantially eliminate turbulence produced by this movement from reaching the interior of the channels where clarification by flotation occurs. The speed of rotation of the chains 76, 76 is set so that clarification is complete by the time the channels 30 reach the exit end of the tank where the seals 36 engage and are guided by the plate 72. At this end the plates 28p rotate around one of the shafts 78 causing the plates to fan out as shown. Clarified water held between the plates flow out into the box 22 through the apertures in the plate 72. Continued rotation raises the sludge out of the water causes it to slide onto the adjustable ramp assembly 92. The chains then carry the paddles in an upside down orientation back to the entrance end where they enter the tank to fill again with raw treated water.

There has been described a clarifier and a method of operation that remove suspended particulate contaminants from raw water at a flotation rate that is approximately double that attainable with the closest comparable single stage clarifier (one not also using a sandbed or the like for second stage clarification). The increased performance allows a more compact unit for a given treatment rate, or an increased treatment rate for the same size tank. These advantages are provided at a competitive cost of manufacture.

While the invention has been described with reference to its preferred embodiments, it will be understood that various modifications and alterations will occur to those skilled in the art from the foregoing detailed description and the accompanying drawings. For example, while a set of endless chains are described as propelling the plates through the tank, a wide variety of other mechanical expedients could be used to produce the movement of a set of plates as described above. A wide variety of alternative arrangements can also be used to introduce the raw treated water to the plates, and then remove the clarified water and floated sludge. For example, the channels 30 can be top-filled at one end of the tank with the clarified water drawn out of the bottom through a suitable manifold. Different seals can be used between the plates and the tank, or no seals, merely a close spacing between the plates and the adjacent tank walls. The invention can also be used in combination with a second stage sand filter at the bottom of the tank. In such an arrangement, the lamellae can also hold filter material in the tank during backwashing. These and other modifications and variations are intended to fall wthin the scope of the appended claims.

What is claimed is:

1. Apparatus for the clarification of raw water treated with a flocculating agent and dissolved air that is released as microscopic bubbles that float flocced particulate contaminants to the surface of the water where they form a sludge comprising, a generally rectilinear tank having inlet means for introducing raw treated water at one end; outlet means for withdrawing clarified water at a second, opposite end; and means for removing sludge from the surface of the water that holds a supply of the water during the flotation, means extending from approximately the bottom of the tank to at least the surface of the water mounted for movement within the tank for holding the water in a plurality of channels each of which extend generally vertically within the tank, said channels substantially isolated from each other such that flotation within each of said channels occurs substantially independently of one another during the flotation, and means for moving said holding means within said tank in a generally horizontal linear path from said first end to said second end whereby said flotation occurs in said channels with substantially no turbulence.

2. The apparatus according to claim 1 wherein said channels are inclined from the vertical to provide an enhanced flotation path length and an increased clarification capacity for a given tank size.

3. The apparatus according to claim 2 wherein said tank, has a generally flat bottom wall, and wherein said holding means comprises a set of mutually parallel spaced plates.

4. The apparatus according to claim 3, wherein said plates are generally flat, inclined from the vertical when moving through said tank between said first and second ends, and oriented generally transverse to said linear path to define a plurality of said channels between adjacent ones of said plates.

5. The apparatus according to claim 3 wherein said inlet means includes a curved wall with apertures that feeds said raw treated water between adjacent ones of said plates as they enter said tank.

6. The apparatus according to claim 3 wherein said outlet means includes a curved wall with apertures disposed at said second end along the locus of the bottom edge of said plates as they exit said tank.

7. The apparatus according to claim 3 wherein said sludge removal means comprises an inclined ramp disposed at said second end that directs sludge sliding off of said plates out of said tank as said plates exit said tank.

8. The apparatus according to claim 7 wherein said ramp is adjustable to vary its angle of inclination and is mounted above said outlet means.

9. The apparatus according to claim 3 wherein said moving means comprises an endless conveyor mounted over said tank along said linear path, said plates each being secured adjacent one edge to said endless conveyor with a generally uniform mutual spacing between said plates along said conveyor.

10. The apparatus according to claim 9 wherein said endless conveyor includes a pair of shafts, at least one of which is driven, means for mounting the shafts rotatably over said first and second ends of said tank, a pair of sprockets secured on the end of each shaft, and a pair of endless chains driven carried on said sprockets and secured to said plates.

11. The apparatus of claim 4 further comprising means for establishing a sliding seal between the tank and at least the bottom edge of each of said plates.

12. The apparatus according to claim 3 wherein said plates include at least one reinforcing rib and at least a portion of said plates have sludge ports formed at an upper edge to allow the passage therethrough of sludge as said plates move through said tank.

13. The apparatus of claim 3 wherein said tank has a sump formed in its bottom wall to collect sediment.

* * * * *